(12) United States Patent
Hanamoto

(10) Patent No.: US 10,389,899 B2
(45) Date of Patent: Aug. 20, 2019

(54) DOCUMENT PRESSING UNIT, AND AUTOMATIC DOCUMENT CONVEYING DEVICE AND IMAGE FORMING APPARATUS PROVIDED WITH THE SAME

(71) Applicant: KYOCERA Document Solutions Inc., Osaka-shi (JP)

(72) Inventor: Katsuhiko Hanamoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/912,867

(22) Filed: Mar. 6, 2018

(65) Prior Publication Data

US 2018/0270374 A1 Sep. 20, 2018

(30) Foreign Application Priority Data

Mar. 16, 2017 (JP) .................................. 2017-051158

(51) Int. Cl.
*H04N 1/00* (2006.01)
*G03G 15/00* (2006.01)
(Continued)

(52) U.S. Cl.
CPC ........... *H04N 1/00554* (2013.01); *B65H 1/04* (2013.01); *B65H 5/062* (2013.01); *B65H 29/14* (2013.01);
(Continued)

(58) Field of Classification Search
CPC ........... H04N 1/00554; H04N 1/00551; H04N 2201/0422
See application file for complete search history.

(56) References Cited

U.S. PATENT DOCUMENTS 4,849,793 A * 7/1989 Someya ............. G03B 27/6228
355/75
6,433,897 B1 * 8/2002 Wilcox .................. B41J 13/103
271/10.11
(Continued)

FOREIGN PATENT DOCUMENTS

| JP | 2003-51906 | 2/2003 |
|---|---|---|
| JP | 2017079341 A | 4/2017 |
| WO | 2015136950 A1 | 9/2015 |

OTHER PUBLICATIONS

European Search Report dated Jul. 31, 2018.

*Primary Examiner* — Ted W Barnes
(74) *Attorney, Agent, or Firm* — Gerald E. Hespos; Michael J. Porco; Matthew T. Hespos

(57) ABSTRACT

A document pressing unit is openable with respect to an apparatus body including a placement portion on which a document is placed, and is configured to press the document from above. The document pressing unit includes a body frame, a pair of hinge units, a pair of metal fixing members, and fastening screws. The body frame is able to press the document. The hinge units respectively include hinge legs mounted on the apparatus body, and are mounted with a certain distance in a left-right direction on a rear end of the body frame to openably support the body frame with respect to the apparatus body. The fixing members fix the hinge units to the body frame, respectively. The fastening screws fasten the fixing member and the hinge unit through the body frame so that the fixing member and the hinge unit sandwich the body frame in an up-down direction.

6 Claims, 19 Drawing Sheets

(51) Int. Cl.
*B65H 1/04* (2006.01)
*B65H 5/06* (2006.01)
*B65H 29/14* (2006.01)
*G03B 27/62* (2006.01)

(52) U.S. Cl.
CPC ....... G03G 15/605 (2013.01); H04N 1/00551 (2013.01); H04N 1/00564 (2013.01); H04N 1/00604 (2013.01); H04N 1/00795 (2013.01); B65H 2801/39 (2013.01); G03B 27/62 (2013.01); H04N 1/00538 (2013.01); H04N 2201/0094 (2013.01); H04N 2201/0422 (2013.01)

(56) References Cited

U.S. PATENT DOCUMENTS

| | | | | |
|---|---|---|---|---|
| 2002/0054376 A1* | 5/2002 | Wada | ................... | H04N 1/024 358/472 |
| 2004/0228082 A1* | 11/2004 | Tiao | ................... | H04N 1/00519 361/679.27 |
| 2008/0308995 A1* | 12/2008 | Tobinaga | .............. | G03G 15/602 271/8.1 |
| 2010/0165418 A1* | 7/2010 | Yamasaki | .......... | H04N 1/00557 358/474 |
| 2011/0075232 A1* | 3/2011 | Nakahara | ............. | G03G 15/605 358/498 |
| 2011/0235131 A1* | 9/2011 | Hanamoto | ......... | H04N 1/00519 358/474 |
| 2014/0023416 A1* | 1/2014 | Suzuki | ............... | H04N 1/00554 399/380 |
| 2015/0015920 A1* | 1/2015 | Muraoka | ........... | H04N 1/00543 358/400 |
| 2016/0065770 A1* | 3/2016 | Kurotsu | ............. | H04N 1/00559 358/497 |
| 2017/0070626 A1* | 3/2017 | Ikeda | ................. | H04N 1/00554 |
| 2017/0126910 A1* | 5/2017 | Miura | ....................... | B41J 29/02 |

\* cited by examiner

DOCUMENT PRESSING UNIT, AND AUTOMATIC DOCUMENT CONVEYING DEVICE AND IMAGE FORMING APPARATUS PROVIDED WITH THE SAME

This application is based on Japanese Patent Application No. 2017-051158 filed on Mar. 16, 2017, the contents of which are hereby incorporated by reference.

BACKGROUND

The present disclosure relates to a document pressing unit openable with respect to an apparatus body, and an automatic document conveying device and an image forming apparatus provided with the document pressing unit.

Conventionally, there is known, as a document pressing unit, an automatic document conveying device incorporated in an image forming apparatus. The automatic document conveying device is openable with respect to an apparatus body of the image forming apparatus, and has a function of pressing a document placed on a contact glass of an upper surface portion of the apparatus body from above.

Further, there is known a hinge unit for openably supporting an automatic document conveying device with respect to an apparatus body. The hinge unit is fixed to a frame of the automatic document conveying device by a fixing screw. On the other hand, a hinge leg of the hinge unit is mounted in a hinge receptor formed in a support of the apparatus body.

SUMMARY

A document pressing unit according to an aspect of the present disclosure is openable with respect to an apparatus body including a placement portion on which a document is placed, and is configured to press the document from above. The document pressing unit includes: a body frame, a pair of hinge units, a pair of metal fixing members, and a plurality of fastening screws. The body frame is able to press the document. The paired hinge units respectively include hinge legs to be mounted on the apparatus body, are mounted on a lower surface portion of the body frame with a certain distance in a left-right direction on a rear end of the body frame, and support the body frame to be openable with respect to the apparatus body. The paired fixing members are mounted on an upper surface portion of the body frame, and fix the paired hinge units to the body frame, respectively. The plurality of fastening screws fasten the fixing member and the hinge unit to each other through the body frame in such a manner that the fixing member and the hinge unit sandwich the body frame in an up-down direction. A plurality of screw holes are formed in the body frame for allowing the fastening screws to pass through the body frame between the fixing member and the hinge unit, each of the screw holes having an inner diameter larger than an outer diameter of a screw portion of each of the fastening screws.

An automatic document conveying device according to another aspect of the present disclosure includes the document pressing unit having the aforementioned configuration; a document feeding tray on which a document is placed; a document conveying portion for conveying the document placed on the document feeding tray to pass a predetermined reading position on the placement portion; and a document discharge tray for receiving the document after the document passes the reading position.

An image forming apparatus according to yet another aspect of the present disclosure includes: the document pressing unit having the aforementioned configuration; the apparatus body including the placement portion; a reading portion for reading a document image of the document placed on the placement portion; and an image forming portion for forming an image on a sheet, based on the document image read by the reading portion.

An image forming apparatus according to still another aspect of the present disclosure includes: the automatic document conveying device having the aforementioned configuration; the apparatus body including the placement portion; a reading portion for reading a document image of the document to be conveyed by the automatic document conveying device at the reading position; and an image forming portion for forming an image on a sheet, based on the document image read by the reading portion.

These and other objects, features and advantages of the present disclosure will become more apparent upon reading the following detailed description along with the accompanying drawings.

DETAILED DESCRIPTION

Figure 1:
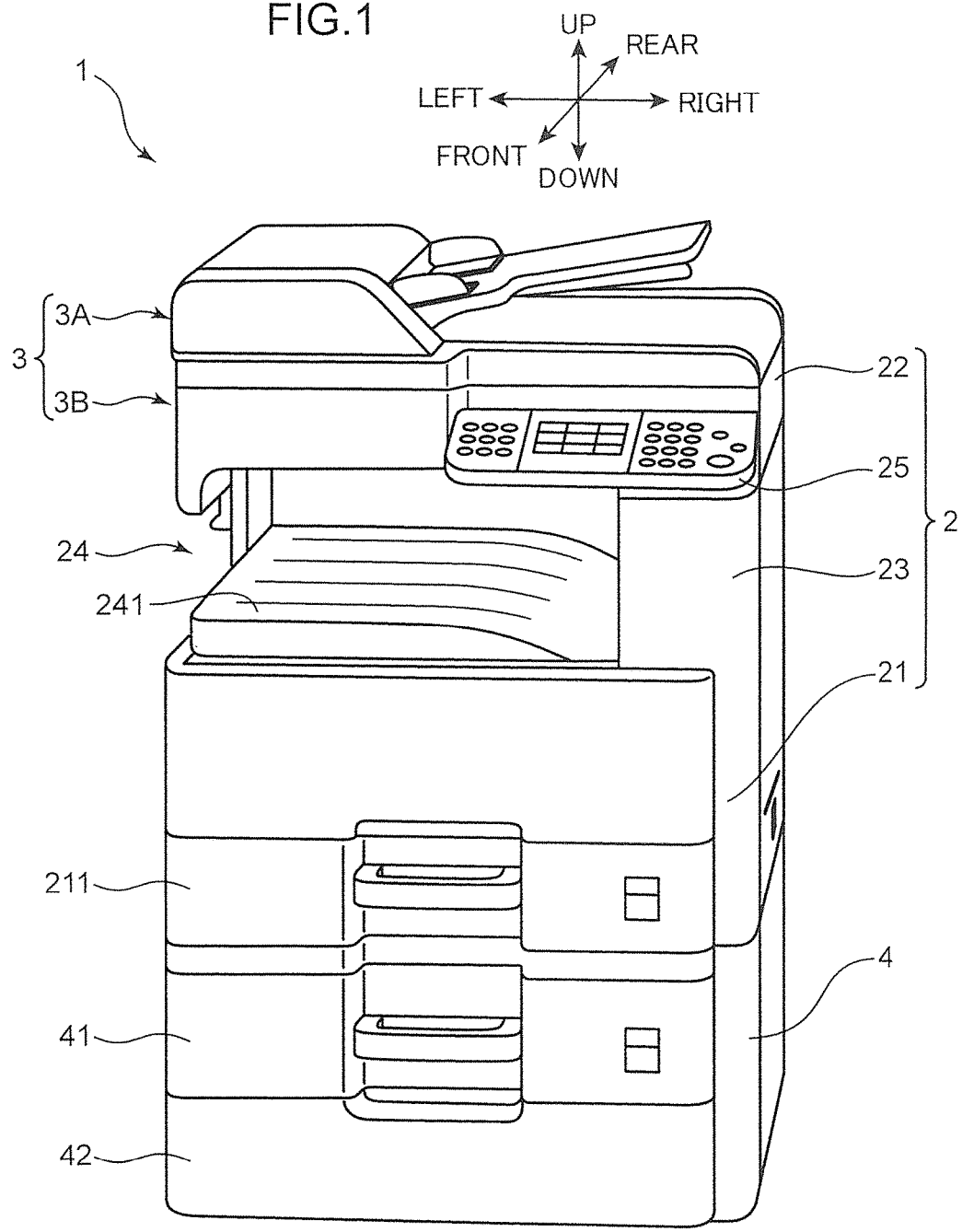
FIG. 1 is a perspective view of an image forming apparatus according to an embodiment of the present disclosure.
Figure 2:
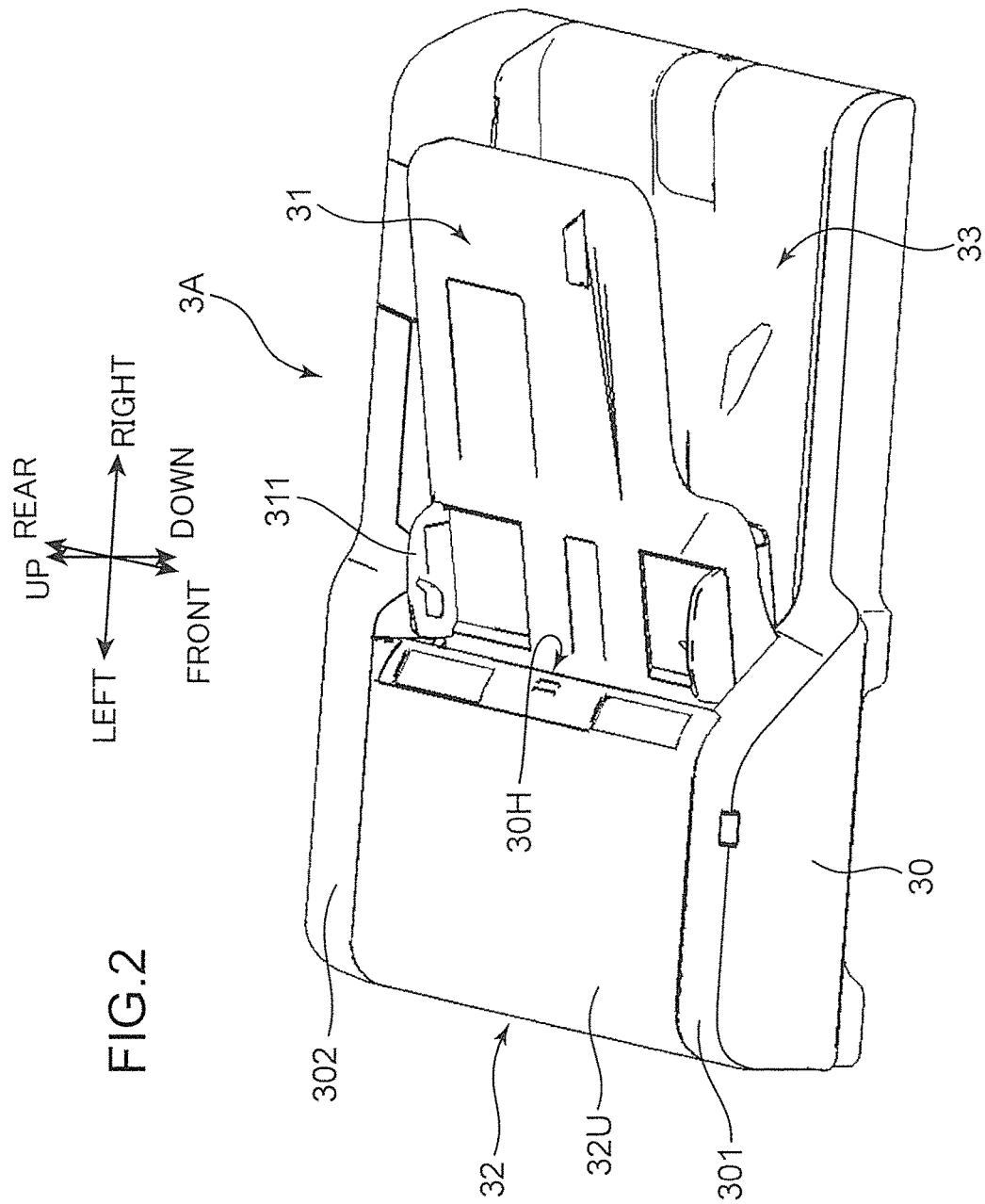
FIG. 2 is a perspective view of an automatic document conveying device according to the embodiment of the present disclosure.
Figure 3:
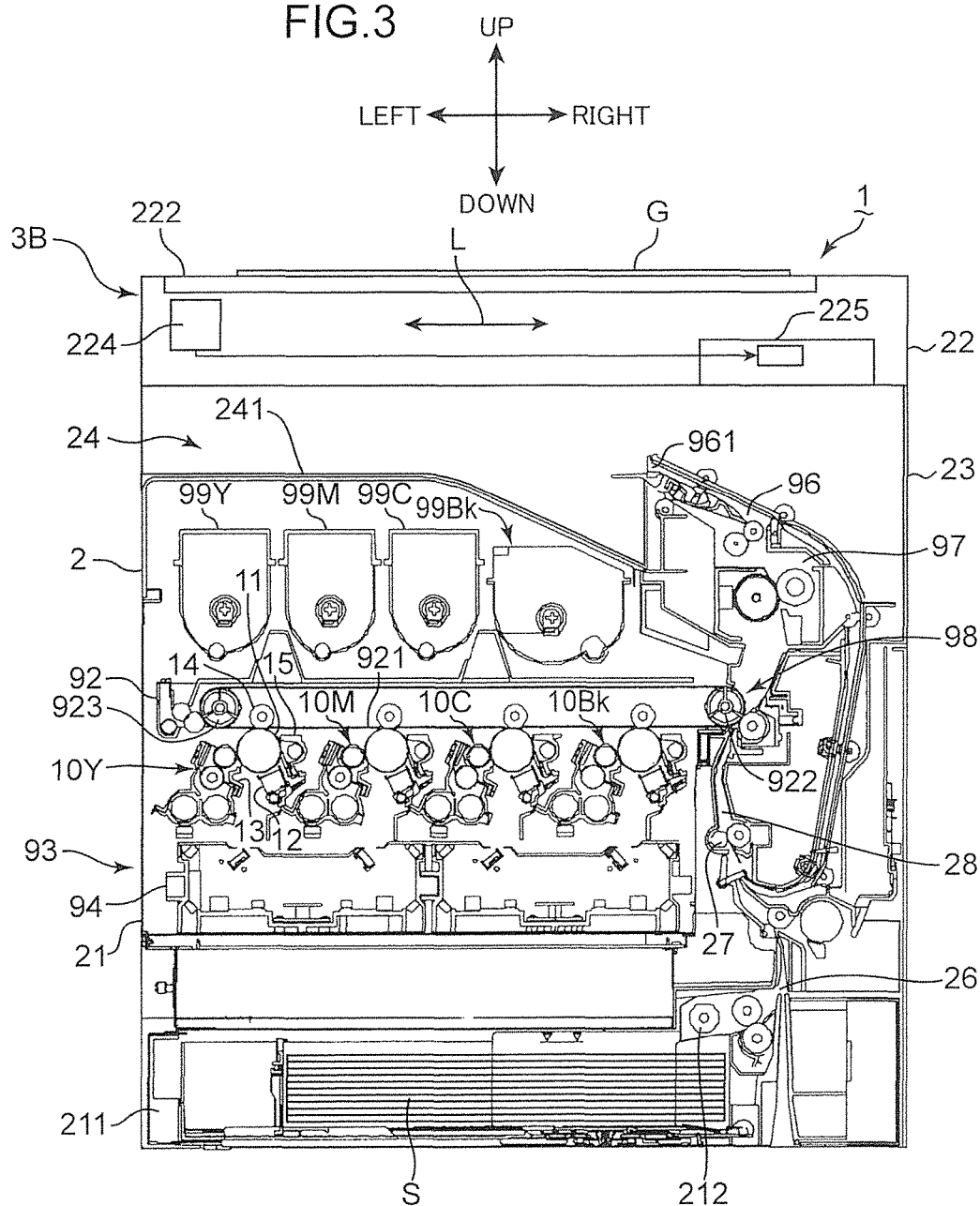
FIG. 3 is a cross-sectional view illustrating an inner structure of the image forming apparatus according to the embodiment of the present disclosure.

In the following, an embodiment of the present disclosure is described in detail with reference to the drawings. FIG. 1 is a perspective view illustrating an external appearance of an image forming apparatus 1 according to the embodiment of the present disclosure. FIG. 2 is a perspective view illustrating an external appearance of an automatic document conveying device 3A. FIG. 3 is a cross-sectional view illustrating an inner structure of the image forming apparatus 1. In this example, a copying machine of an internal discharge type is exemplified as the image forming apparatus 1. The image forming apparatus, however, may be a printer, a facsimile machine, or a complex machine provided with functions of these devices.

The image forming apparatus 1 includes an apparatus body 2 having a substantially rectangular parallelepiped housing structure and including an internal space, the automatic document conveying device 3A (document pressing unit) disposed on an upper surface of the apparatus body 2, and an additional sheet supply unit 4 detachably attached to a lower portion of the apparatus body 2.

The apparatus body 2 performs image forming processing with respect to a sheet. The apparatus body 2 includes a substantially rectangular parallelepiped lower housing member 21, a substantially rectangular parallelepiped upper housing member 22 disposed above the lower housing member 21, and a connection housing member 23 for connecting the lower housing member 21 and the upper housing member 22. Various components for image formation are accommodated within the lower housing member 21. An image reading unit 3B for optically reading a document image is accommodated within the upper housing member 22. An image reading device 3 is constituted by the automatic document conveying device 3A and the image reading unit 3B. An internal space surrounded by the lower housing member 21, the upper housing member 22, and the connection housing member 23 serves as an internal sheet discharge portion 24 capable of accommodating a sheet after image formation. The connection housing member 23 is disposed on the side of a right portion of the apparatus body 2, and a discharge port 961 (FIG. 3) for discharging a sheet onto the internal sheet discharge portion 24 is formed in the connection housing member 23. A bottom surface 241 of the internal space is defined by an upper surface of the lower housing member 21, and sheets discharged through the discharge port 961 are stacked on the bottom surface 241.

An operation panel unit 25 is formed to project from a front surface of the upper housing member 22. The operation panel unit 25 receives a user's input on various operation commands. A sheet cassette 211 for accommodating recording sheets for image forming processing is mounted on the lower housing member 21. The additional sheet supply unit 4 includes sheet cassettes 41 and 42 for accommodating recording sheets for image forming processing, as well as the sheet cassette 211. In FIG. 3, only the sheet cassette 211 of the lower housing member 21 is illustrated.

The automatic document conveying device 3A is pivotally mounted on an upper surface of the upper housing member 22 of the apparatus body 2 on the rear side of the apparatus body 2. In FIG. 3, illustration of the automatic document conveying device 3A is omitted. The automatic document conveying device 3A automatically feeds a document sheet G to be copied toward a predetermined document reading position of the apparatus body 2 in a state (closed state) that the automatic document conveying device 3A is in contact with an upper surface of the upper housing member 22. On the other hand, when a user manually places a document sheet G (FIG. 3) at a predetermined document reading position, the automatic document conveying device 3A is temporarily opened upward (opened state).

Referring to FIG. 2, the automatic document conveying device 3A includes a housing 30, a document feeding tray 31, a document conveying portion 32, and a document discharge tray 33. The housing 30 is a housing member for accommodating various mechanisms provided in the automatic document conveying device 3A. The automatic document conveying device 3A includes a front wall portion 301 and a rear wall portion 302 bulging upward on a left portion thereof for accommodating the document conveying portion 32, and includes a substantially flat lower portion on a right portion thereof.

The document feeding tray 31 is a tray on which a document sheet G (document) to be fed to an image reading position is placed. The document feeding tray 31 is formed on the housing 30 to extend rightward from a document feeding port 30H of the housing 30. A pair of cursors 311 for sheet alignment of a placed document sheet G are formed on the document feeding tray 31.

The document conveying portion 32 includes an unillustrated conveying path and an unillustrated conveying mechanism for conveying a document sheet G placed on the document feeding tray 31 to the document discharge tray 33 via an image reading position (reading position) on a contact glass 222 (FIG. 3). The document conveying portion 32 includes an upper cover unit 32U mounted in an opening between the front wall portion 301 and the rear wall portion 302 of the housing 30.

The document discharge tray 33 is a tray for receiving a document sheet G after a document image on the document sheet G is optically read. An upper surface of the lower portion on the right side of the housing 30 serves as the document discharge tray 33.

Next, an inner structure of the apparatus body 2 is described with reference to FIG. 3. Toner containers 99Y, 99M, 99C, and 99Bk, an intermediate transfer unit 92, an image forming portion 93, an exposure unit 94, and the aforementioned sheet cassette 211 are accommodated within the lower housing member 21 in this order from the upper side.

The image forming portion 93 forms an image on a sheet, based on an image transmitted from a personal computer or the like, or based on a document image read by a CIS unit 224. The image forming portion 93 includes four image forming units 10Y, 10M, 10C, and 10Bk for respectively forming toner images of yellow (Y), magenta (M), cyan (C), and black (Bk) to form a full-color toner image. Each of the image forming units 10Y, 10M, 10C, and 10Bk includes a photosensitive drum 11, and also includes a charger 12, a developing device 13, a primary transfer roller 14, and a cleaning device 15 disposed around the photosensitive drum 11.

The yellow toner container 99Y, the magenta toner container 99M, the cyan toner container 99C, and the black toner container 99Bk are configured to store toners of the respective colors, and to supply toners of the respective colors to the developing devices 13 of the image forming units 10Y, 10M, 10C, and 10Bk associated with the respective colors of Y, M, C, and Bk through unillustrated supply paths.

The exposure unit 94 includes various optical components such as a light source, a polygonal mirror, a reflection mirror, and a deflection mirror, and forms an electrostatic latent image by radiating light based on image data of a document image on a peripheral surface of the photosensitive drum 11 provided in each of the image forming units 10Y, 10M, 10C, and 10Bk.

The intermediate transfer unit 92 includes an intermediate transfer belt 921, a drive roller 922, and a driven roller 923. Toner images are superimposed from the respective photosensitive drums 11 onto the intermediate transfer belt 921 (primary transfer). The superimposed toner images are secondly transferred onto a recording sheet to be fed from the sheet cassette 211 by a secondary transfer portion 98.

The sheet cassette 211 (41, 42) accommodates a stack S of sheets constituted by a plurality of recording sheets. A dispensing roller 212 is disposed on an upper portion of a right end of the sheet cassette 211. The stack of sheets within the sheet cassette 211 are dispensed one by one from an uppermost recording sheet by driving the dispensing roller 212, and is conveyed into a carry-in conveyance path 26.

A conveyance path 28 extending to the discharge port 961 via the secondary transfer portion 98, a fixing unit 97 to be described later, and a sheet discharge unit 96 is formed downstream of the carry-in conveyance path 26. A registration roller pair 27 is disposed upstream of the secondary transfer portion 98 within the conveyance path 28. The sheet is temporarily stopped by the registration roller pair 27, and after skew correction, the sheet is fed to the secondary transfer portion 98 at a predetermined timing for image transfer.

The fixing unit 97 and the sheet discharge unit 96 are accommodated within the connection housing member 23. The fixing unit 97 performs fixing processing by applying heat and a pressure to the recording sheet on which a toner image is secondarily transferred in the secondary transfer portion 98. The recording sheet carrying a color image which has undergone fixing processing is discharged toward the internal sheet discharge portion 24 through the discharge port 961 by the sheet discharge unit 96 disposed downstream of the fixing unit 97.

The image reading unit 3B is disposed on the upper housing member 22. The image reading unit 3B includes the contact glass 222 (placement portion), the CIS unit 224 (reading portion), and an image processing unit 225. The contact glass 222 serves as a reading surface which faces a document sheet G to be automatically fed from the automatic document conveying device 3A, and a document sheet G placed on an upper surface of the contact glass 222 in a state that a document surface thereof faces downward. The contact glass 222 is configured to read images of these document sheets G. The automatic document conveying device 3A is openable with respect to the apparatus body 2 including the contact glass 222 on which a document sheet G is placed, and functions as a document pressing unit of the present disclosure, which has a function of pressing the document sheet G from above.

The CIS unit 224 optically reads a document image of a document sheet G set stationary on the contact glass 222, or a document image of a document sheet G to be conveyed by the automatic document conveying device 3A. The CIS unit 224 extends in a front-rear direction (main scanning direction), and is movable in a left-right direction (sub-scanning direction) by unillustrated moving means. The CIS unit 224 includes an unillustrated LED light source, a graded-index (GRIN) lens array, and a contact image sensor (CIS). Reflected light from a document sheet G illuminated with light from the LED light source is subjected to photoelectric conversion by the linear CIS via the GRIN lens array, and an image of the document sheet G is read. Image data of the document image subjected to photoelectric conversion by the CIS is transmitted to the image processing unit 225. The image processing unit 225 performs various image processing with respect to the image data in accordance with a reading condition of the document image, and transmits the processed image data to the exposure unit 94.

Figure 4:
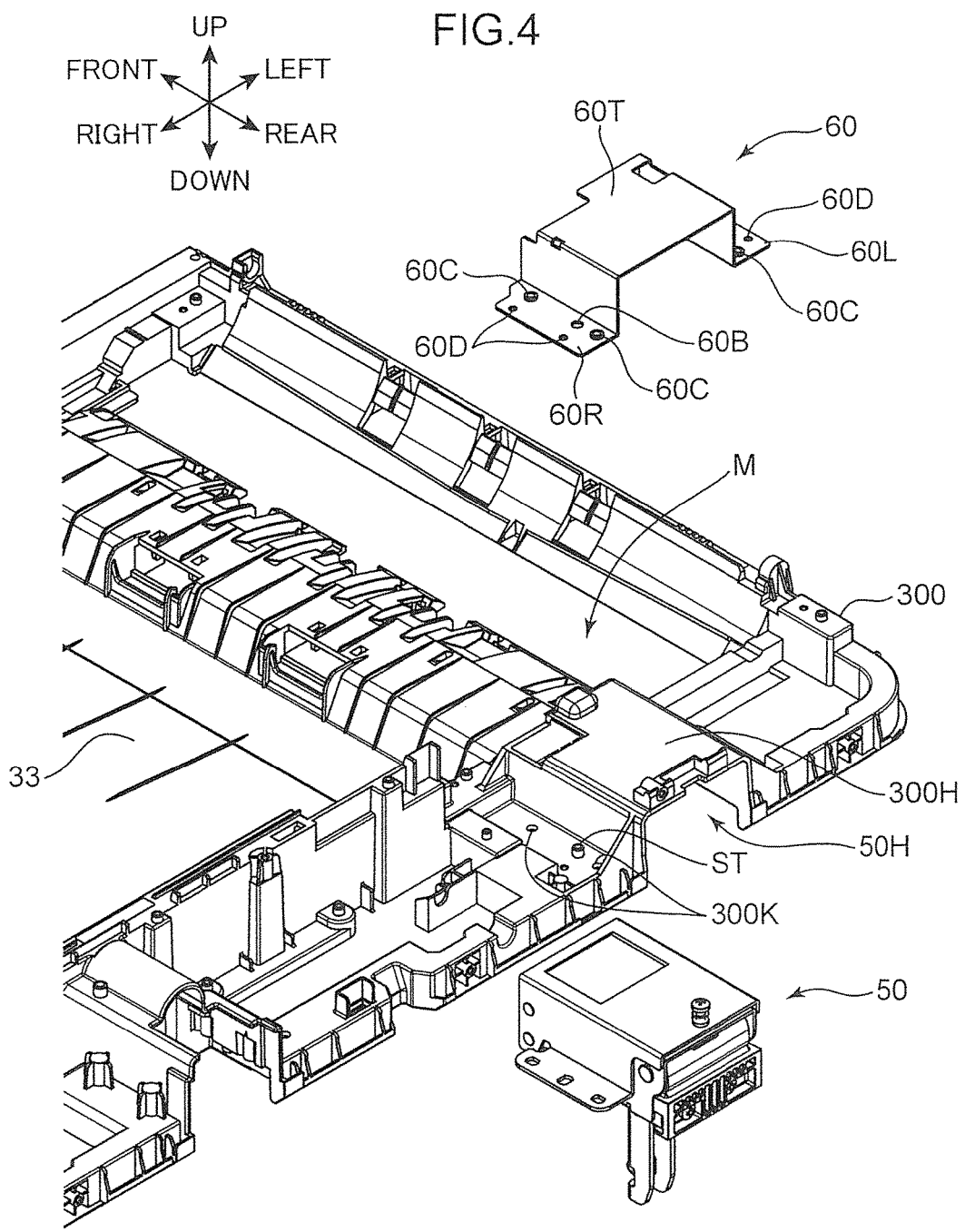
FIG. 4 is an exploded perspective view illustrating a part of the automatic document conveying device according to the embodiment of the present disclosure.
Figure 5:
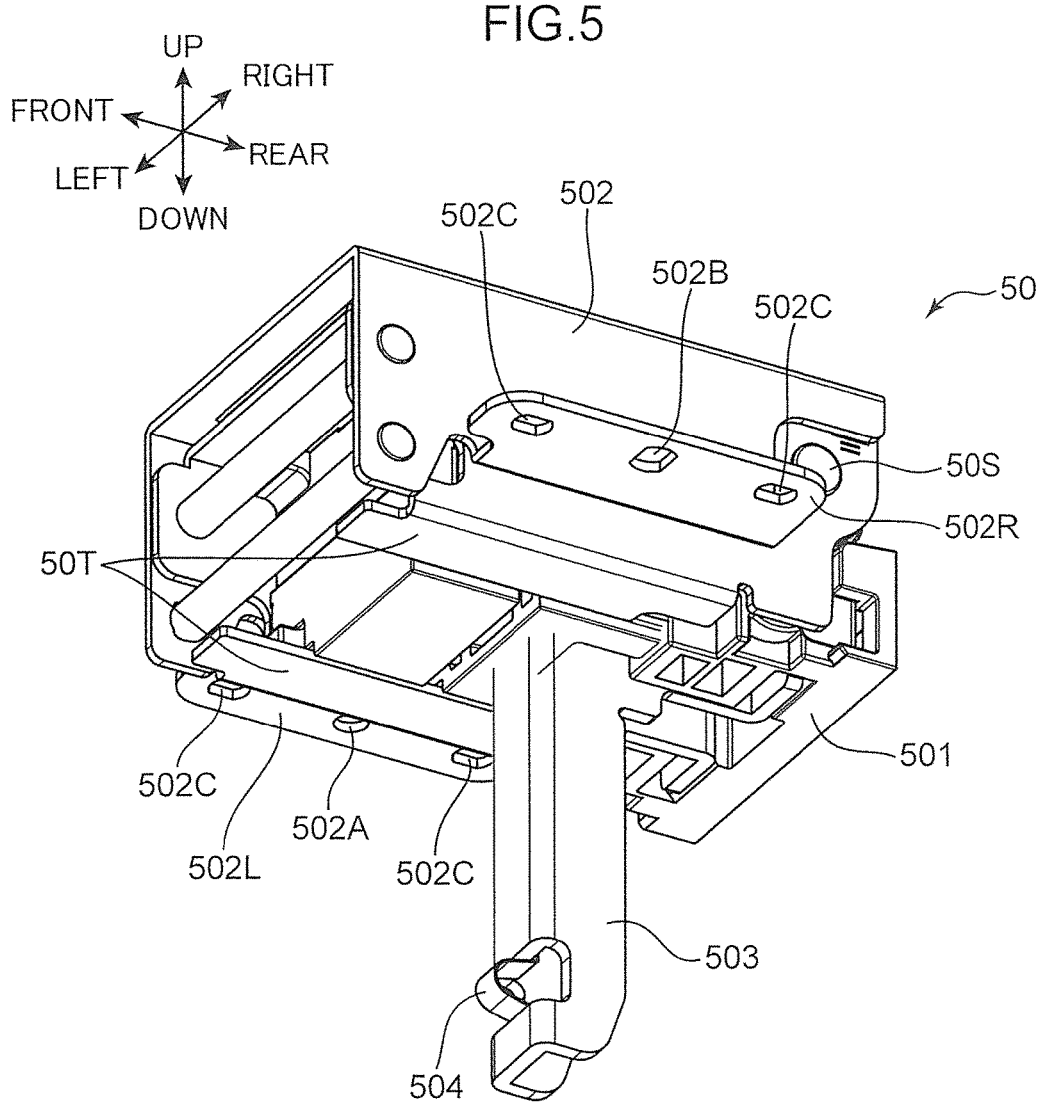
FIG. 5 is a perspective view of a hinge unit in the embodiment of the present disclosure.
Figure 6:
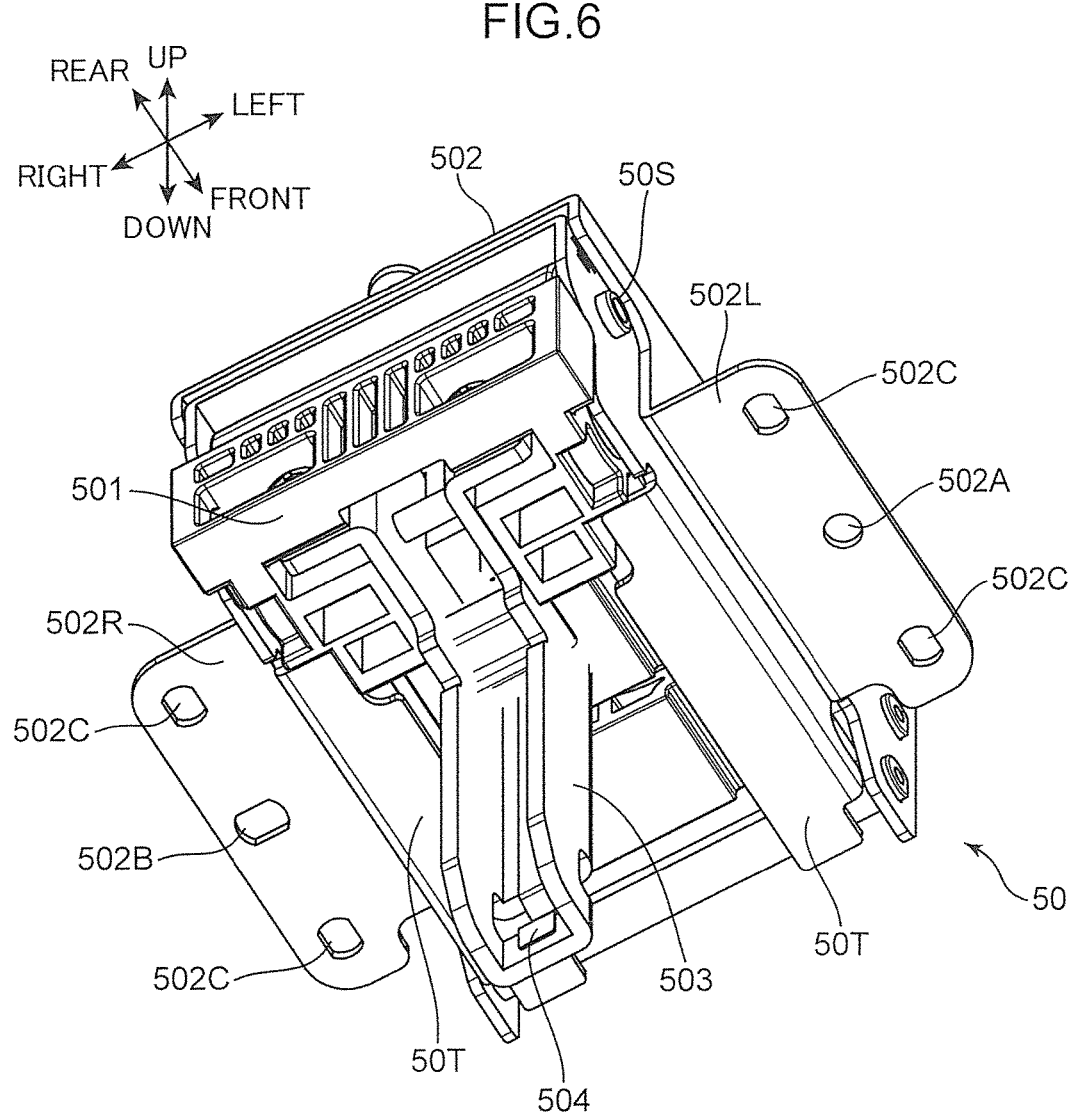
FIG. 6 is a perspective view of the hinge unit in the embodiment of the present disclosure.
Figure 7:
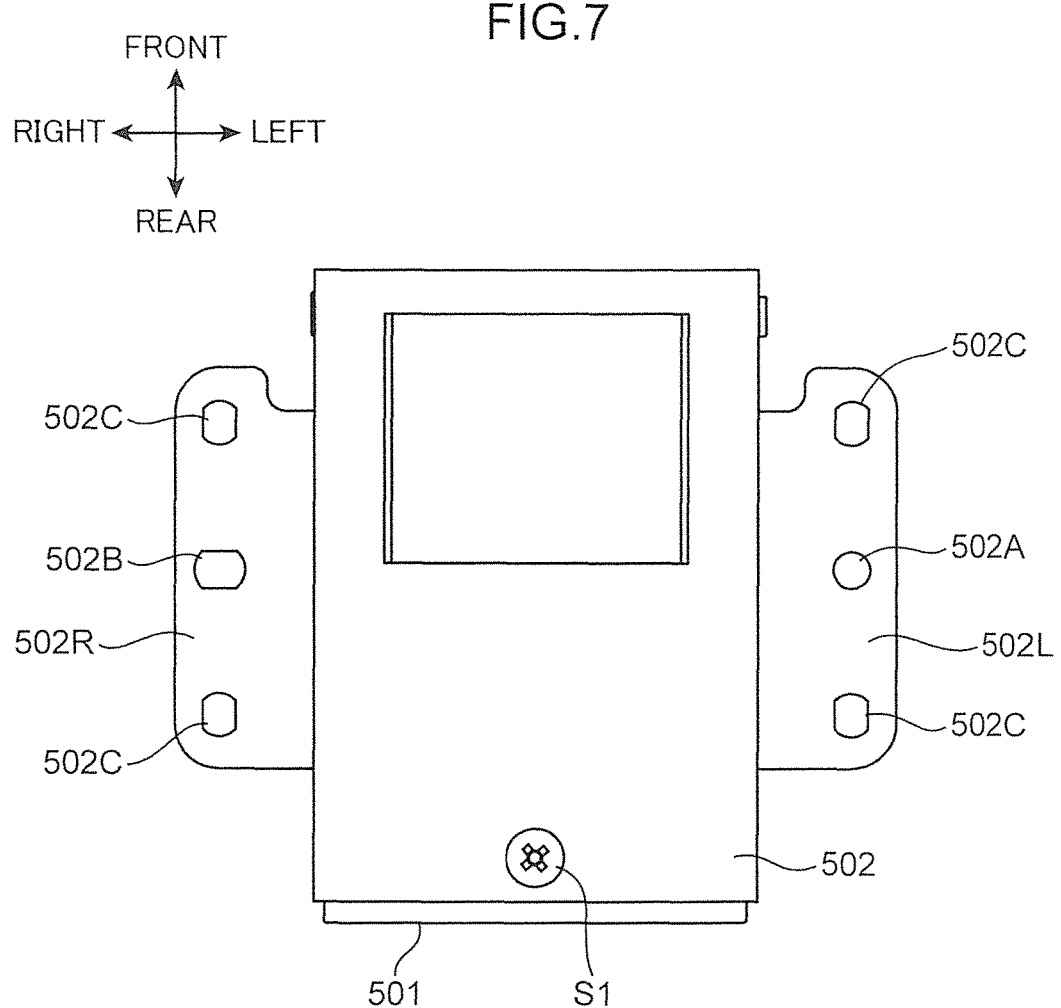
FIG. 7 is a plan view of the hinge unit in the embodiment of the present disclosure.
Figure 8:
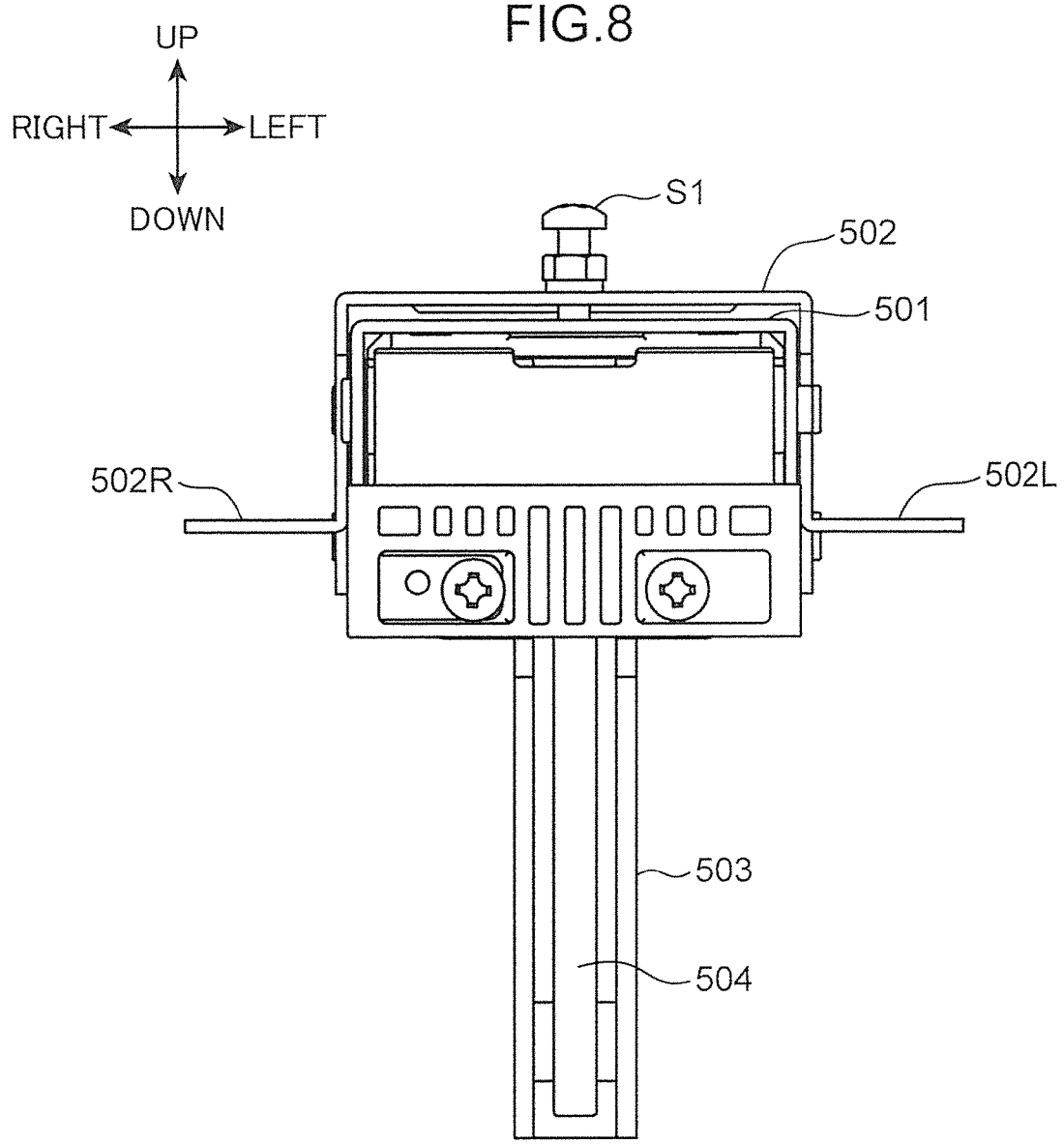
FIG. 8 is a rear view of the hinge unit in the embodiment of the present disclosure.

FIG. 4 is an exploded perspective view illustrating a part of the automatic document conveying device 3A according to the present disclosure. FIG. 5 and FIG. 6 are perspective views of a hinge unit 50 in the present disclosure. FIG. 7 to FIG. 10 are respectively a plan view, a rear view, a side view, and a front view of the hinge unit 50 in the present disclosure.

Referring to FIG. 4, the automatic document conveying device 3A includes a housing frame 300 (body frame), a pair of left and right hinge units 50, and a pair of left and right hinge fixing members 60 (fixing member). In FIG. 4, the left hinge unit 50 of the paired left and right hinge units 50, and the left hinge fixing member 60 of the paired left and right hinge fixing members 60 are illustrated. The automatic document conveying device 3A is openable with respect to the apparatus body 2 by mounting the paired hinge units 50 on the housing frame 300. Further, the automatic document conveying device 3A includes a plurality of screws S1 to S3 (FIG. 7, FIG. 8, FIG. 11, FIG. 12).

The housing frame 300 defines a lower portion of the automatic document conveying device 3A. The housing frame 300 extends in the front-rear direction and in the left-right direction, and is able to press a document sheet G on the contact glass 222. An unillustrated pad sheet (document press-contact member) configured to come into press contact with a document sheet G on the contact glass 222 is fixed to a lower surface portion of the housing frame 300. In the embodiment, the housing frame 300 is made of a resin material, and is formed by integral molding. Further, as illustrated in FIG. 4, the aforementioned document discharge tray 33 is included on an upper surface portion of the housing frame 300. Further, as illustrated in FIG. 4, a reading opening portion M extending in the front-rear direction is opened in a left end of the housing frame 300. A document sheet G to be conveyed by the document conveying portion 32 of the automatic document conveying device 3A is disposed to face the contact glass 222 via the reading opening portion M.

Further, the housing frame 300 includes a pair of left and right frame convex portions 300H (convex portion). In FIG. 4, only the left frame convex portion 300H of the paired frame convex portions 300H is illustrated. The frame convex portion 300H has an upward projecting shape in order to form a hinge mounting portion 50H (accommodating portion) for accommodating the hinge unit 50. In the embodiment, the frame convex portion 300H has a substantially rectangular parallelepiped shape. Further, a pair of hinge fastening holes 300K (screw holes), and a boss ST are disposed on each of the left and right sides of the frame convex portion 300H of the housing frame 300. It should be noted that a pair of hinge fastening holes 300K, and a boss ST are also disposed on the left side of the frame convex portion 300H illustrated in FIG. 4.

Referring to FIG. 4 to FIG. 10, the paired hinge units 50 are mounted on the lower surface portion of the housing frame 300 with a certain distance in the left-right direction on a rear end of the housing frame 300, and openably support the housing frame 300 with respect to the apparatus body 2. Each of the hinge units 50 includes a hinge body portion 501, a hinge cover 502, a hinge leg 503, and a hinge ground member 504 (ground member) (FIG. 5).

The hinge body portion 501 has a substantially rectangular parallelepiped shape, and pivotally supports the hinge leg 503. An unillustrated spring for retaining an opened posture of the automatic document conveying device 3A when the automatic document conveying device 3A is opened with respect to the apparatus body 2 is accommodated within the hinge body portion 501. Pedestal surfaces 50T being a bottom surface portion of the hinge body portion 501 come into contact with the upper surface portion of the apparatus body 2 when the automatic document conveying device 3A is mounted on the apparatus body 2. Further, as illustrated in FIG. 5, a shaft portion 50S serving as a pivot shaft for pivotal movement of the hinge leg 503 is disposed on a rear portion of the hinge body portion 501 to extend in the left-right direction.

Figure 10:
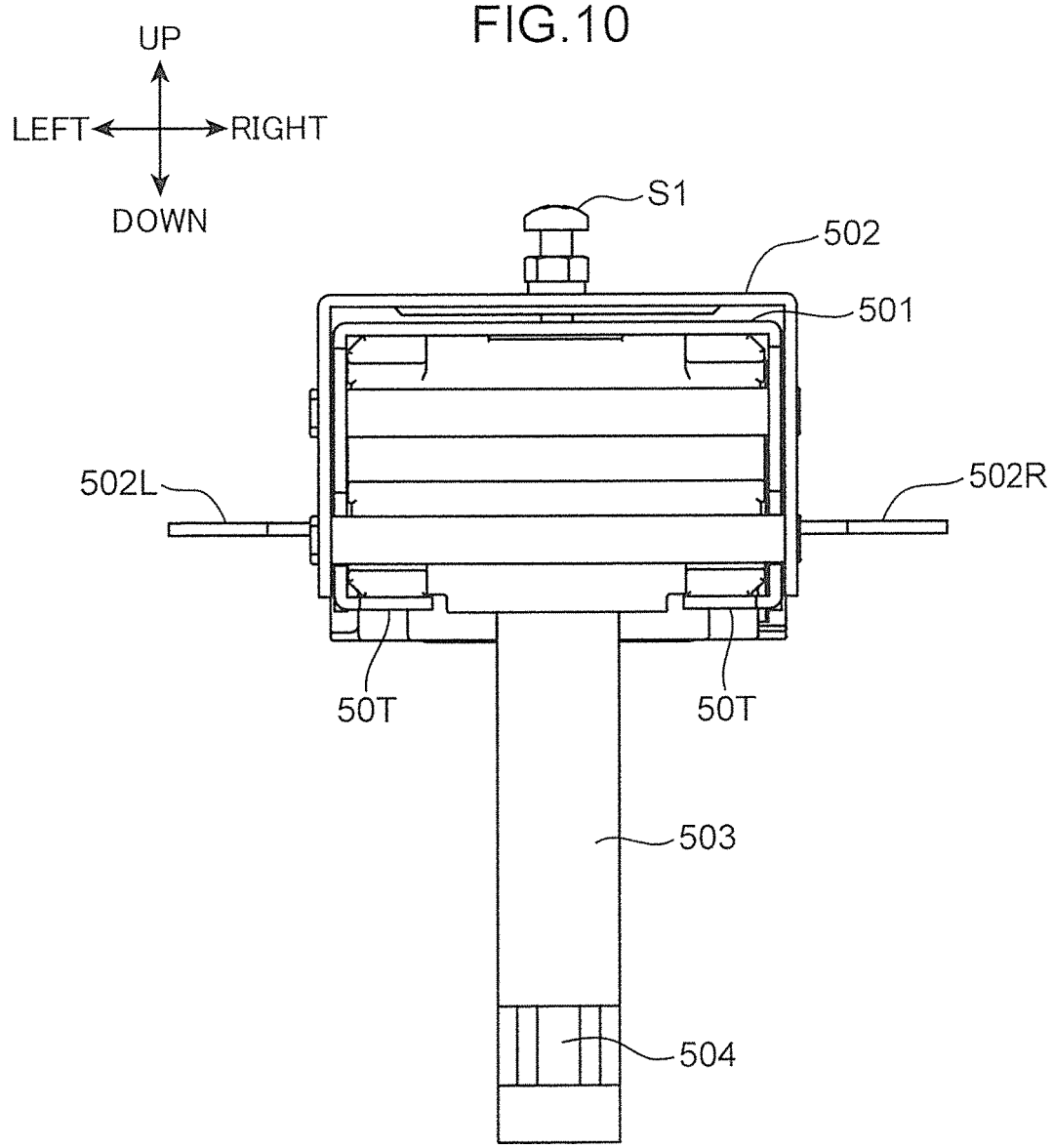
FIG. 10 is a front view of the hinge unit in the embodiment of the present disclosure.

As illustrated in FIG. 10, the hinge cover 502 has a U-shape such that the hinge cover 502 is opened downward, and is fixed to the hinge body portion 501 by the screw S1. In the embodiment, the hinge cover 502 is made of a metal material, and is formed by press molding. The hinge cover 502 has a right hinge flange 502R and a left hinge flange 502L (a pair of hinge flanges). The right hinge flange 502R and the left hinge flange 502L respectively extend outward in the left-right direction from left and right edges of the hinge cover 502. Further, as illustrated in FIG. 6, the right hinge flange 502R and the left hinge flange 502L are disposed with a certain distance in the left-right direction in such a manner as to sandwich the hinge body portion 501. A boss hole 502A is opened in a middle portion of the left hinge flange 502L in the front-rear direction. Further, a boss hole 502B is opened in a middle portion of the right hinge flange 502R in the front-rear direction. Further, a pair of screw holes 502C are opened in each of the left hinge flange 502L and the right hinge flange 502R in such a manner that each of the boss hole 502A and the boss hole 502B is interposed between the paired screw holes 502C in the front-rear direction.

The hinge leg 503 extends along an up-down direction, and is mounted on a hinge mounting portion 22S (see FIG. 19) of the apparatus body 2. The hinge leg 503 is disposed to project downward from a lower surface portion of the hinge body portion 501. The hinge leg 503 has a substantially U-shape when viewed from below (FIG. 5 and FIG. 6).

Figure 9:
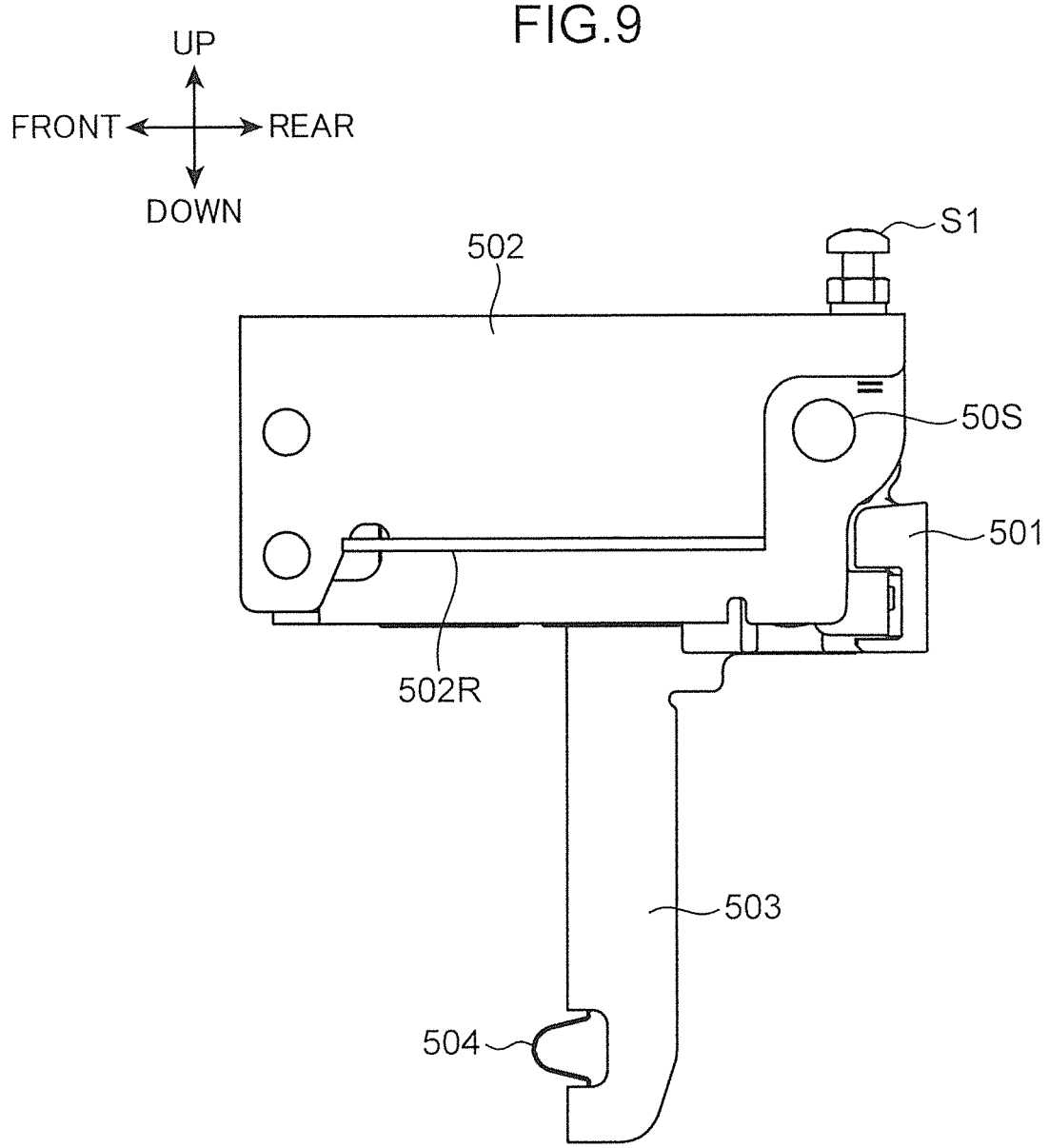
FIG. 9 is a side view of the hinge unit in the embodiment of the present disclosure.

The hinge ground member 504 is a plate spring disposed to extend along the up-down direction within the hinge leg 503. As illustrated in FIG. 5 and FIG. 9, a lower end of the hinge ground member 504 projects forward through an opening formed in the hinge leg 503. Consequently, when the hinge leg 503 is inserted into the hinge mounting portion 22S (see FIG. 19) of the apparatus body 2, the projecting portion of the hinge ground member 504 comes into contact with a metal frame (unillustrated) of the apparatus body 2. An upper end of the hinge ground member 504 is electrically connected to the hinge cover 502 within the hinge leg 503.

Referring to FIG. 4, the paired hinge fixing members 60 are mounted on the upper surface portion of the housing frame 300 to respectively fix the paired hinge units 50 to the housing frame 300. As illustrated in FIG. 4, the hinge fixing member 60 has a U-shape such that the hinge fixing member 60 is opened downward, and is fixed to the housing frame 300 by a plurality of screws S2 (FIG. 11) to be described later. In the embodiment, the hinge fixing member 60 is made of a metal material, and is formed by press molding. The hinge fixing member 60 includes a fixing-member body portion 60T, a fixing-member right flange 60R and a fixing-member left flange 60L (a pair of fixing-member flanges). The fixing-member body portion 60T has a shape such that the fixing-member body portion 60T covers the frame convex portion 300H from above between the fixing-member right flange 60R and the fixing-member left flange 60L.

The fixing-member right flange 60R and the fixing-member left flange 60L respectively extend outward in the left-right direction from left and right edges of the fixing-member body portion 60T. Further, the fixing-member right flange 60R and the fixing-member left flange 60L are disposed with a certain distance in the left-right direction in such a manner as to sandwich the frame convex portion 300H. A boss hole 60A (FIG. 12) is opened in an inner position of the fixing-member left flange 60L in the left-right direction. Further, a boss hole 60B (FIG. 4) is opened in an inner position of the fixing-member right flange 60R in the left-right direction. Further, a pair of screw holes 60C are opened in each of the fixing-member left flange 60L and the fixing-member right flange 60R in such a manner that each of the boss hole 60A and the boss hole 60B is interposed between the paired screw holes 60C in the front-rear direction. Further, a pair of screw holes 60D are opened in each of the fixing-member left flange 60L and the fixing-member right flange 60R in an outer position than the paired screws 60C in the left-right direction.

Figure 19:
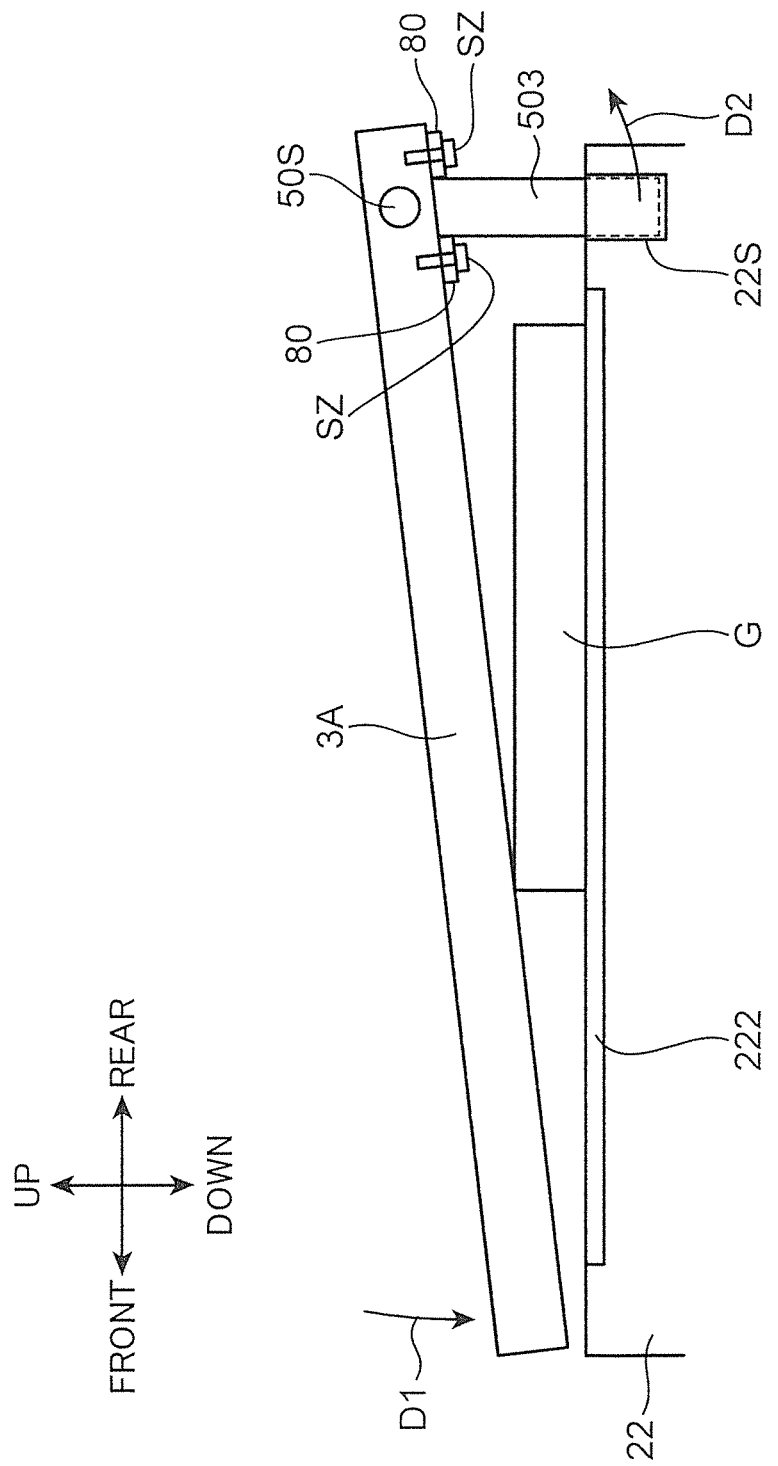
FIG. 19 is a schematic side view of another image forming apparatus as a comparative example with respect to the image forming apparatus according to the embodiment of the present disclosure.

FIG. 19 is a schematic side view of another image forming apparatus as an comparative example with respect to the image forming apparatus 1 according to the embodiment. The comparative image forming apparatus includes an upper housing member 22 and an automatic document conveying device 3A. The upper housing member 22 includes a contact glass 222 and a hinge mounting portion 22S. The automatic document conveying device 3A includes a hinge leg 503 configured to be pivotally movable around a shaft portion 50S, and a fixing portion 80. The hinge leg 503 is fixed to a frame portion of the automatic document conveying device 3A by screws SZ via the fixing portion 80. By mounting the hinge leg 503 on the hinge mounting portion 22S of the upper housing member 22, the automatic document conveying device 3A is made openable.

As illustrated in FIG. 19, when a book as a document sheet G is placed on the contact glass 222, and a user of the comparative image forming apparatus presses down a front portion of the automatic document conveying device 3A, a force as indicated by the arrow D1 is exerted on the front portion of the automatic document conveying device 3A. In this case, a force indicated by the arrow D2 is exerted on a lower end of the hinge leg 503. When distortion occurs in the hinge leg 503 by the force D2, uneven stress may be applied to a peripheral portion of the screws SZ. When such stress is repeatedly applied, a crack or damage is likely to occur in the fixing portion 80 or in the frame portion of the automatic document conveying device 3A around the screws SZ. In particular, when the fixing portion 80 or the frame portion of the automatic document conveying device 3A is made of a resin material, breakage or damage of the resin portion is likely to occur.

Figure 11:
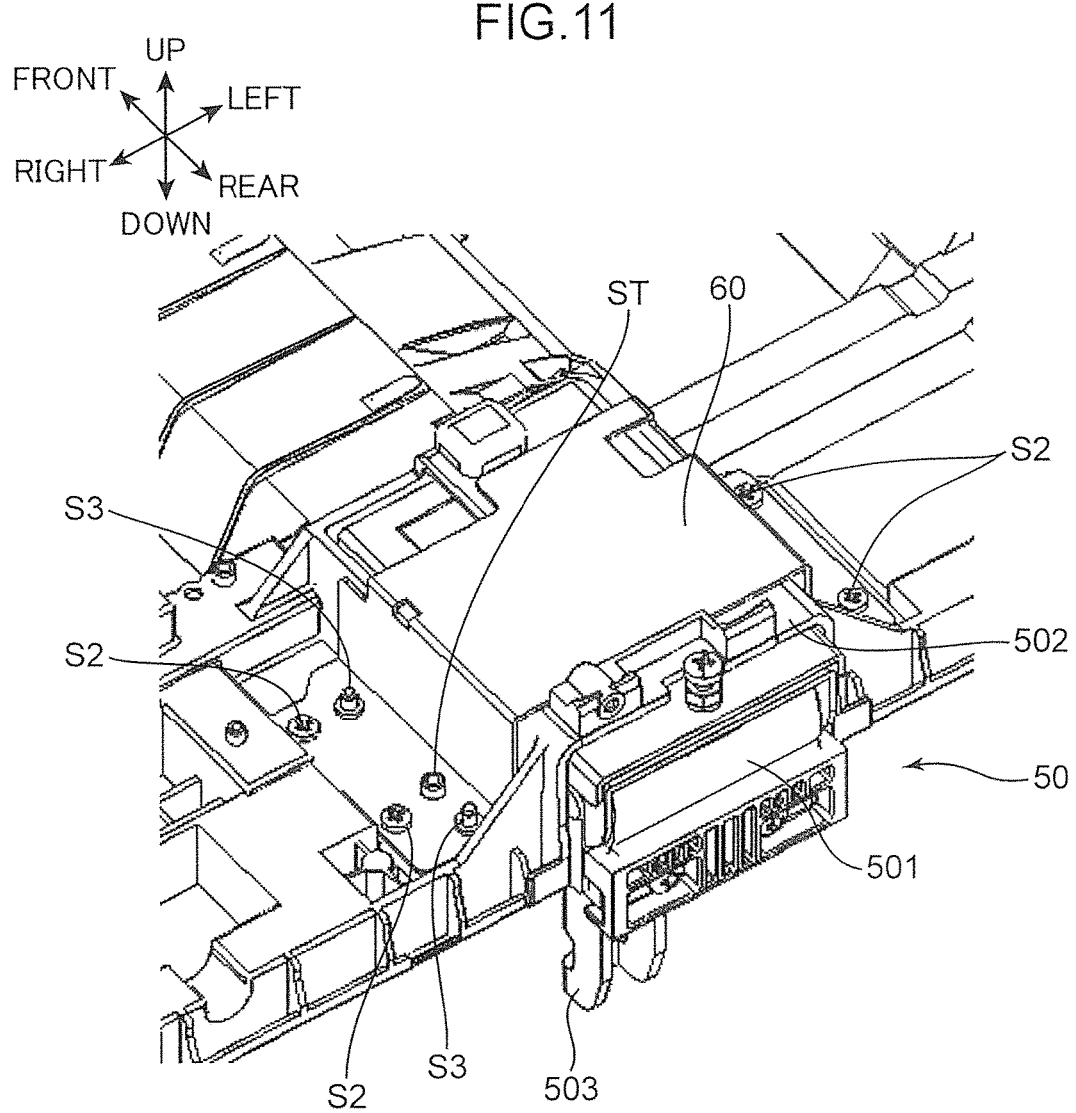
FIG. 11 is a perspective view illustrating a state that the hinge unit is mounted on a frame of the automatic document conveying device according to the embodiment of the present disclosure.
Figure 12:
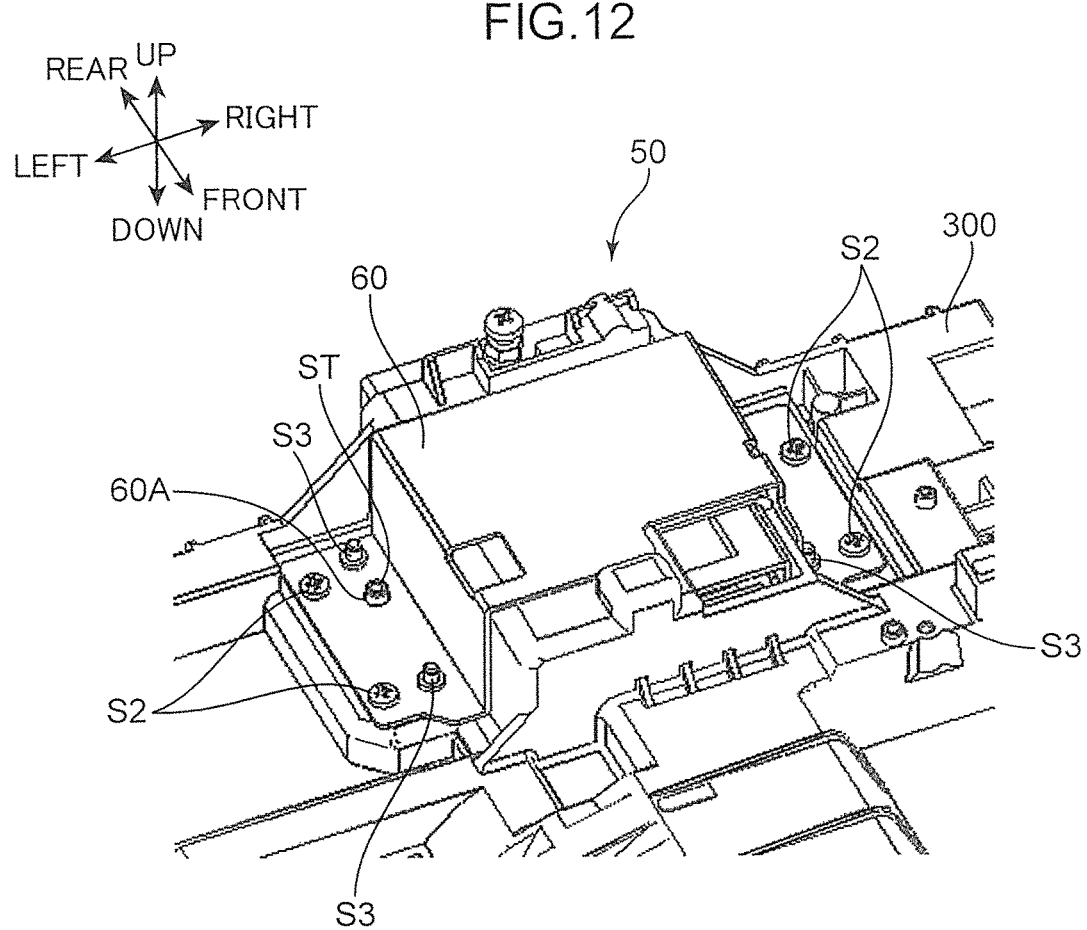
FIG. 12 is a perspective view illustrating a state that the hinge unit is mounted on the frame of the automatic document conveying device according to the embodiment of the present disclosure.
Figure 13:
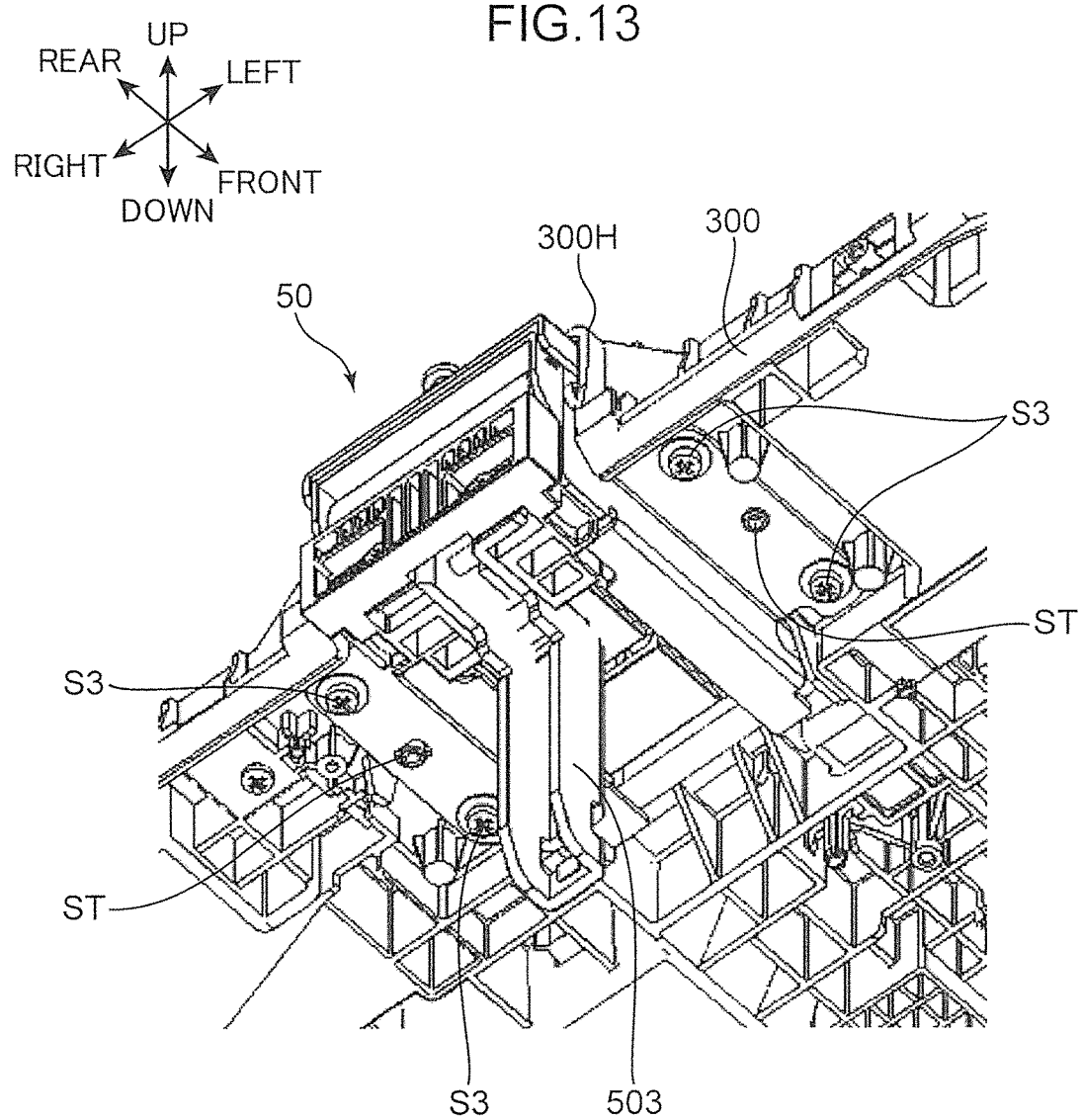
FIG. 13 is a perspective view illustrating a state that the hinge unit is mounted on the frame of the automatic document conveying device according to the embodiment of the present disclosure.
Figure 14:
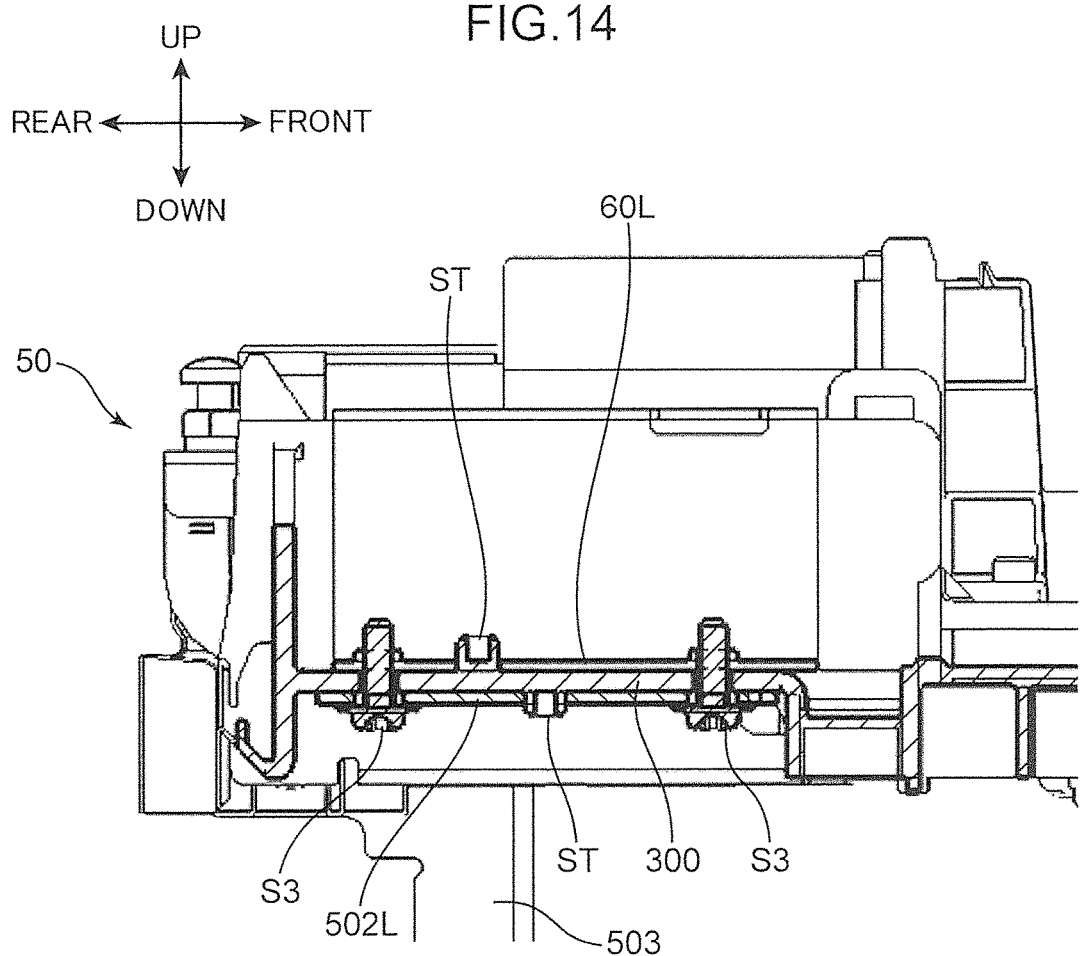
FIG. 14 is an enlarged cross-sectional view illustrating a state that the hinge unit is mounted on the frame of the automatic document conveying device according to the embodiment of the present disclosure.
Figure 15:
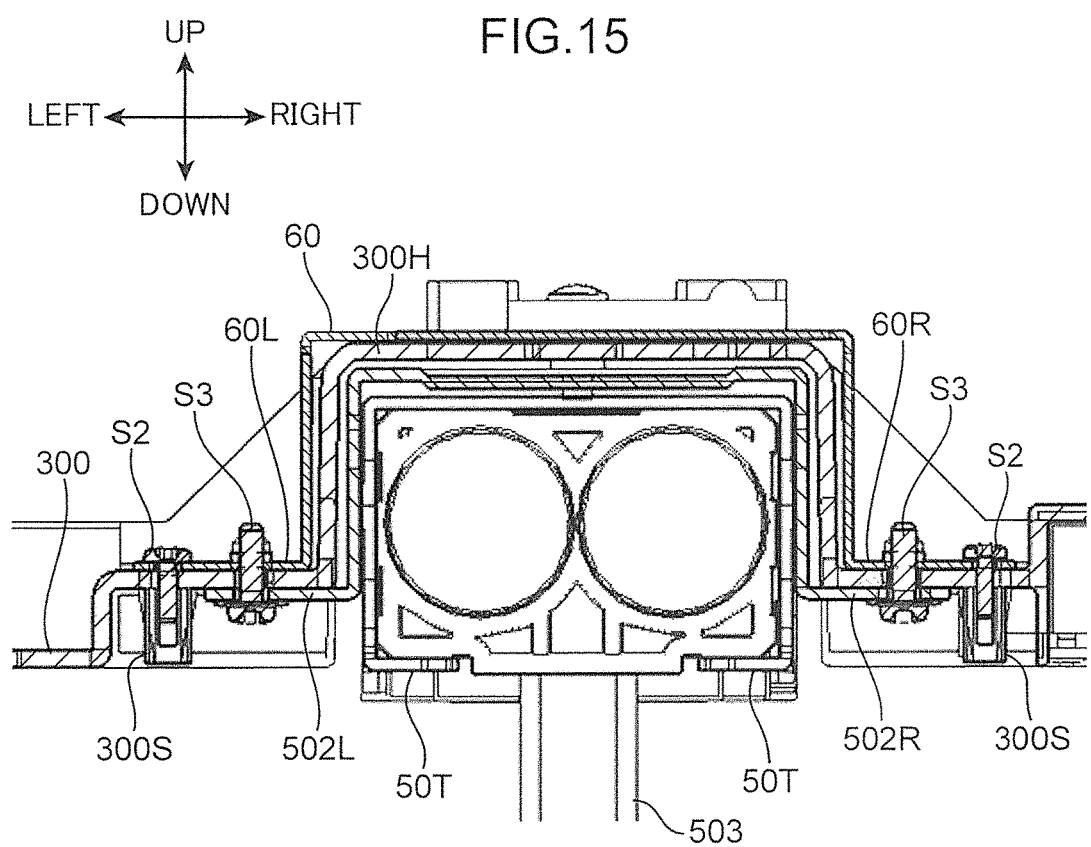
FIG. 15 is an enlarged cross-sectional view illustrating a state that the hinge unit is mounted on the frame of the automatic document conveying device according to the embodiment of the present disclosure.
Figure 16:
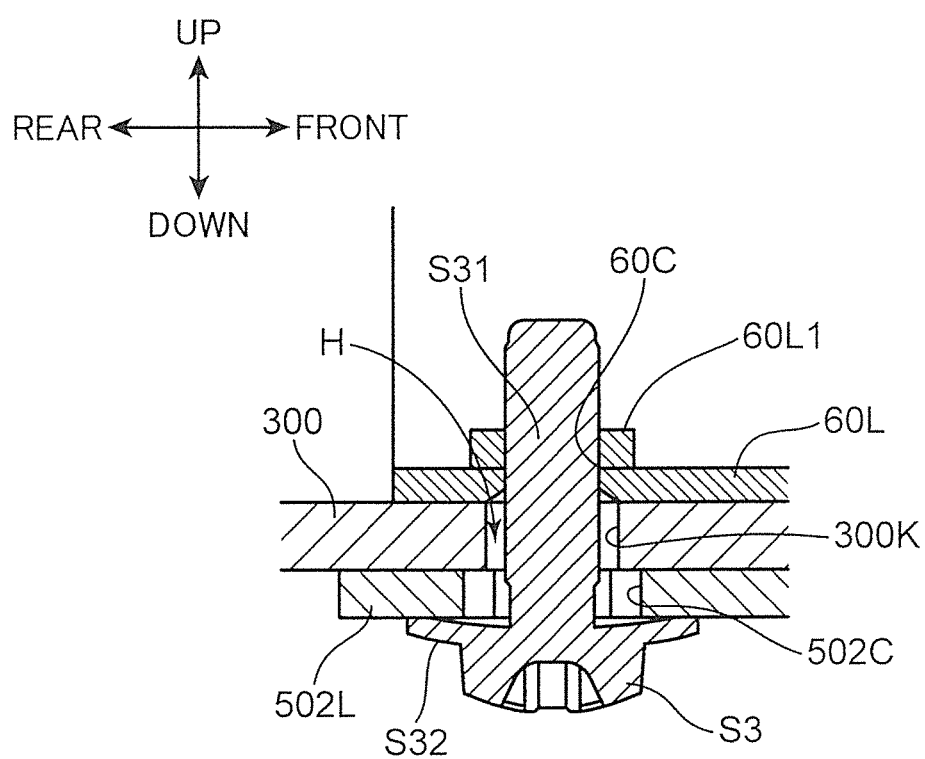
FIG. 16 is a diagram illustrating a part of FIG. 14, and is a cross-sectional view enlargedly illustrating a periphery of a fastening screw.

In order to solve the aforementioned inconvenience, the embodiment has features that the automatic document conveying device 3A has the aforementioned hinge fixing member 60, and a fixing structure of the hinge unit 50 with respect to the housing frame 300 is provided. FIG. 11 to FIG. 13 are perspective views illustrating a state that the hinge unit 50 is mounted on the housing frame 300 of the automatic document conveying device 3A according to the embodiment. FIG. 14 and FIG. 15 are enlarged cross-sectional views illustrating a state that the hinge unit 50 is mounted on the housing frame 300 of the automatic document conveying device 3A. FIG. 16 is a diagram illustrating a part of FIG. 14, and is a cross-sectional view enlargedly illustrating a periphery of the screw S3.

Referring to FIG. 4, when the hinge unit 50 is fixed to the housing frame 300, first of all, the hinge fixing member 60 is fixed to the housing frame 300. In this case, the hinge fixing member 60 is positioned by inserting the paired left and right bosses ST formed on the housing frame 300 into the boss hole 60A and the boss hole 60B of the hinge fixing member 60. Further, the screws S2 are inserted from above into the screw holes 60D opened in the fixing-member left flange 60L and the fixing-member right flange 60R of the hinge fixing member 60, and are fastened in boss hole portions 300S (FIG. 15) of the housing frame 300. Consequently, the hinge fixing member 60 is fixed to the housing frame 300 in such a manner that the hinge fixing member 60 covers the frame convex portion 300H from above.

Next, the hinge unit 50 is inserted into the hinge mounting portion 50H from below the housing frame 300. Then, the hinge unit 50 is positioned by inserting the paired bosses ST (FIG. 13 and FIG. 14) projecting from the lower surface portion of the housing frame 300 into the boss hole 502A and the boss hole 502B of the hinge cover 502 of the hinge unit 50. In this case, four hinge fastening holes 300K opened in the housing frame 300 are disposed above four screw holes 502C (FIG. 5) of the hinge cover 502, and four screw holes 60C of the hinge fixing member 60 are disposed above the four hinge fastening holes 300K (FIG. 16). Then, the screws S3 (fastening screws) (FIG. 13) are respectively inserted into the four screw holes 502C of the hinge cover 502 from below, and are fastened in the screw holes 60C of the hinge fixing member 60 (FIG. 14 to FIG. 16). Consequently, the plurality of screws S3 fasten the hinge fixing member 60 and the hinge unit 50 to each other through the housing frame 300 in such a manner that the hinge fixing member 60 and the hinge unit 50 sandwich the housing frame 300 in the up-down direction.

Referring to FIG. 16, an inner diameter of the hinge fastening hole 300K is set to be larger than an outer diameter of a screw portion S31 of the screw S3. The hinge fastening hole 300K allows the screw S3 to pass through between the hinge fixing member 60 and the hinge unit 50. Then, as illustrated in FIG. 16, an inner wall portion of the housing frame 300 for defining the hinge fastening hole 300K does not come into contact with the screw S3 (see a gap H illustrated in FIG. 16). An inner wall surface of the fixing-member left flange 60L is bent, and a bent portion 60L1 is formed in the periphery of the screw hole 60C formed in the fixing-member left flange 60L. Consequently, a long fastening area of the screw S3 is set along the up-down direction (axis direction of the screw S3). The hinge unit 50 is stably fixed to the housing frame 300 by allowing a screw head S32 of the screw S3 to press against the left hinge flange 502L, and by engaging the screw portion S31 in the screw hole 60C. In FIG. 16, it appears that there is a gap between an inner peripheral surface of the screw hole 502C and the screw S3. This is because the screw hole 502C is opened into an oblong hole, and FIG. 16 illustrates a cross section taken along a length direction of the screw hole 502C. An inner peripheral surface of a short diameter portion of the screw hole 502C and the screw S3 may come into contact with each other.

In the aforementioned structure of the embodiment, even when an excessive force as illustrated in FIG. 19 is exerted on the automatic document conveying device 3A, the aforementioned force is less likely to be exerted on the housing frame 300, although a force exerted on the hinge unit 50 may be transmitted to the fixing-member left flange 60L (fixing-member right flange 60R) via the screw S3. Therefore, it is possible to prevent concentration of stress on the housing frame 300 made of a resin material, and it is possible to prevent breakage or damage of the housing frame 300.

Further, in the embodiment, the plurality of screws S3 fasten the left hinge flange 502L and the right hinge flange 502R to each other, and fasten the fixing-member left flange 60L and the fixing-member right flange 60R to each other. Further, the plurality of hinge fastening holes 300K are opened in the housing frame 300 between the left hinge flange 502L and the right hinge flange 502R, and between the fixing-member left flange 60L and the fixing-member right-flange 60R. Therefore, it is possible to stably fix the hinge unit 50 to the housing frame 300. Further, since the hinge fixing member 60 and the hinge unit 50 come into planar contact with the housing frame 300, it is easy to disperse a force applied from the hinge unit 50 and the hinge fixing member 60 to the housing frame 300. Consequently, even when the hinge unit 50 and the hinge fixing member 60 are disposed at such a position as to sandwich the housing frame 300, it is possible to prevent concentration of stress on the housing frame 300.

Further, in the embodiment, the housing frame 300 is mounted in such a manner that the hinge fixing member 60 covers the frame convex portion 300H from above. Consequently, it is possible to reinforce the frame convex portion 300H, which partly projects upward, and whose rigidity tends to be lowered, by the hinge fixing member 60.

Further, in the embodiment, the housing frame 300 made of a resin material has a substantially plate shape extending in the front-rear direction and in the left-right direction in such a manner that the housing frame 300 includes the document discharge tray 33. Specifically, substantially the entirety of a lower end of the automatic document conveying device 3A is constituted by the resin-made housing frame 300. When a rear end of the housing frame 300 configured as described above is broken or damaged, it is necessary to exchange the entirety of the automatic document conveying device 3A. Therefore, preventing breakage or damage of the housing frame 300 by the aforementioned structure enables to lower maintenance frequency of the automatic document conveying device 3A and the image forming apparatus 1, thereby implementing cost reduction.

Figure 17:
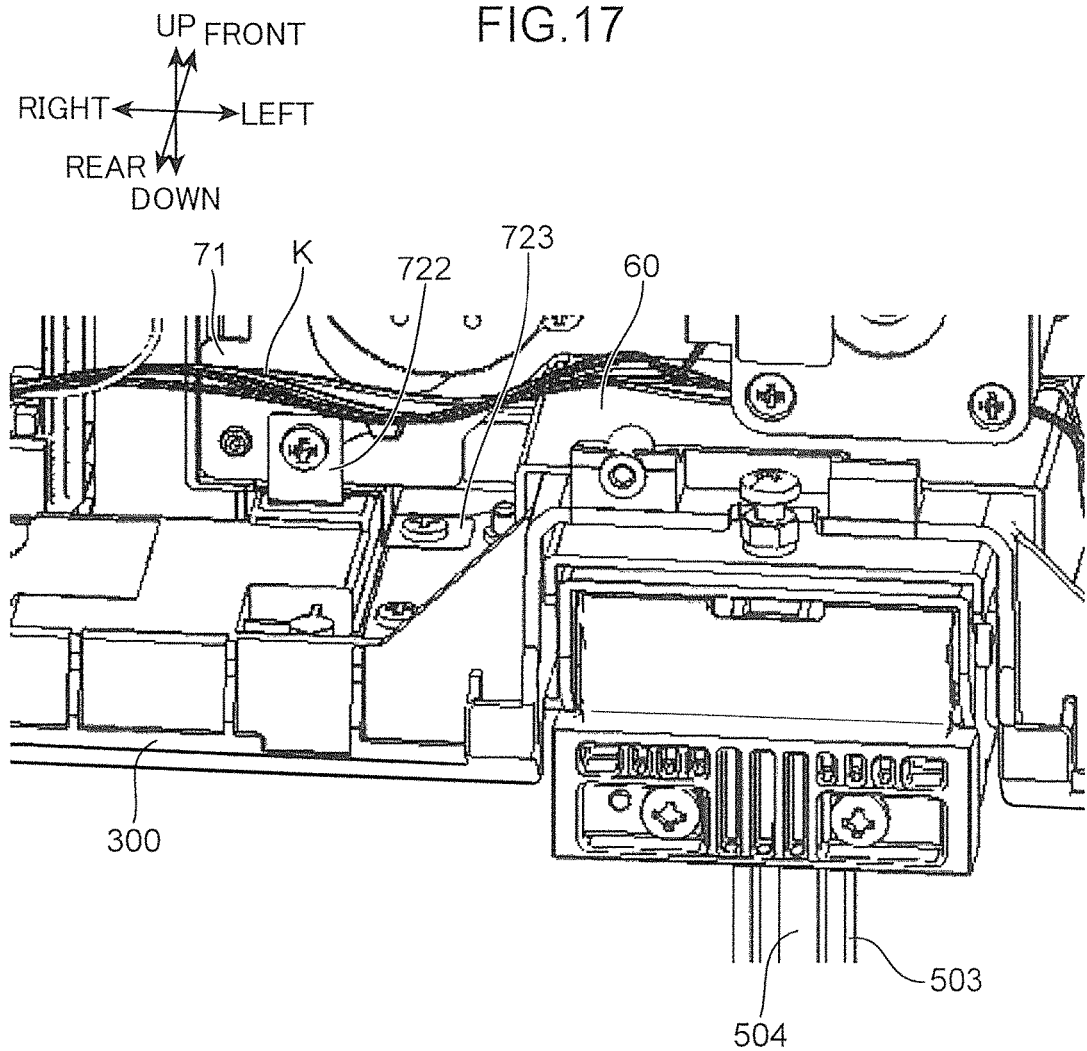
FIG. 17 is an enlarged perspective view enlargedly illustrating a rear portion of the automatic document conveying device according to the embodiment of the present disclosure.
Figure 18:
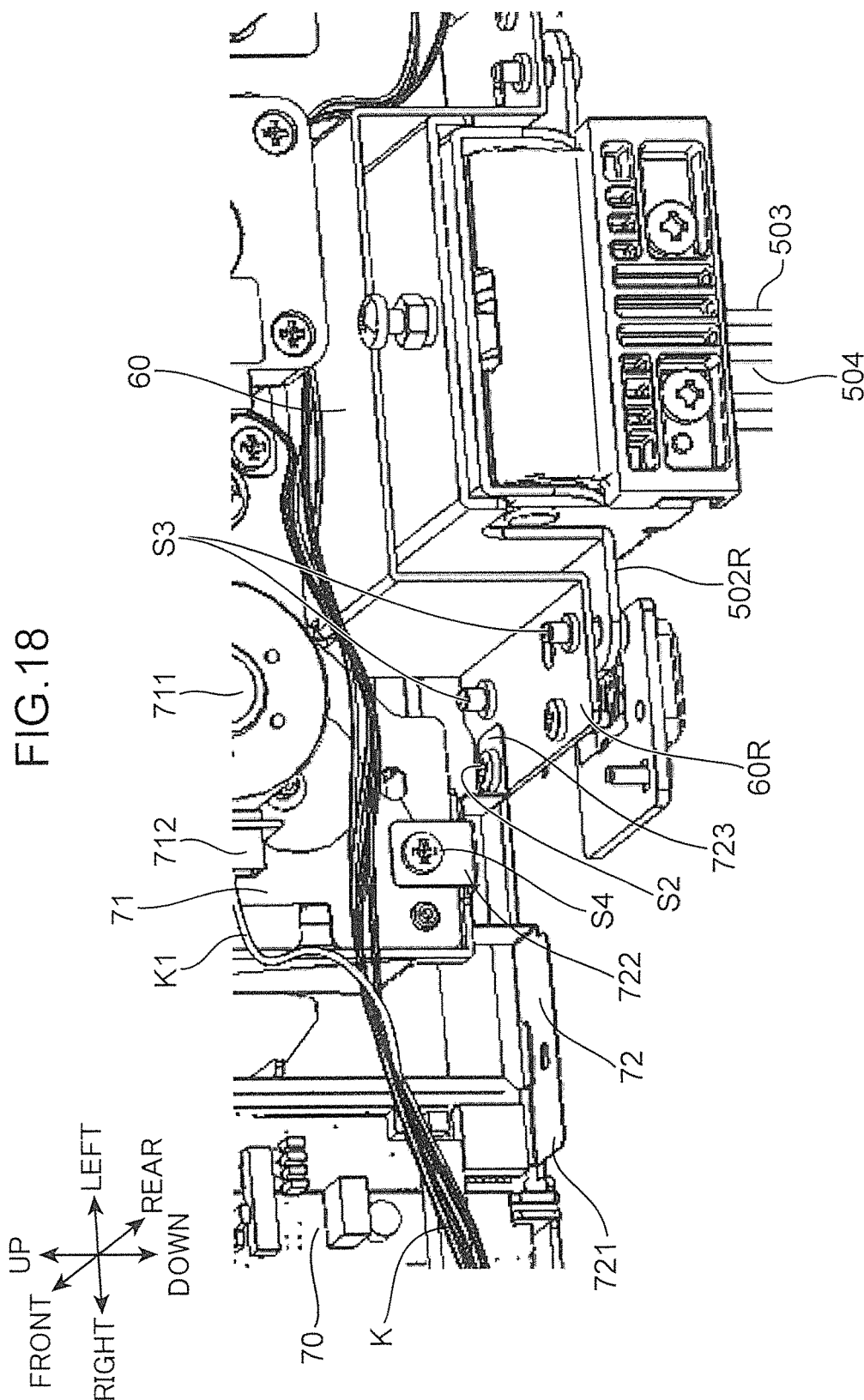
FIG. 18 is an enlarged perspective view enlargedly illustrating the rear portion of the automatic document conveying device according to the embodiment of the present disclosure.

Further, FIG. 17 and FIG. 18 are enlarged perspective views enlargedly illustrating a rear portion of the automatic document conveying device 3A according to the embodiment. In FIG. 18, illustration of the housing frame 300 is omitted.

The automatic document conveying device 3A further includes an electric board 70, a drive board 71, and a ground relay member 72 (connecting member). The electric board 70 is a power supply board for supplying electric power to each member within the automatic document conveying device 3A. The drive board 71 includes a motor 711 and a connector 712. The motor 711 generates a driving force for rotating an unillustrated conveying roller provided within the automatic document conveying device 3A. A drive board harness K1 being a part of an electric harness K extending from the electric board 70 is connected to the drive board 71 via the connector 712.

The ground relay member 72 has a function of grounding the electric board 70 and the drive board 71. The ground relay member 72 is a sheet metal member including a board-side end portion 721, a drive-board connecting portion 722, and a fixing-member connecting portion 723. The board-side end portion 721 is an end portion of the ground relay member 72, and is electrically connected to the electric board 70. Further, the drive-board connecting portion 722 is connected to a ground portion of the drive board 71 by a screw S4. The fixing-member connecting portion 723 is fixed to the fixing-member right flange 60R of the hinge fixing member 60 by the screw S2. Consequently, the electric board 70, the drive board 71, and the hinge fixing member 60 are electrically connected by the ground relay member 72. Further, as described above, the hinge ground member 504 of the hinge unit 50 is electrically connected to the hinge fixing member 60 via the plurality of screws S3, and are electrically connected to the apparatus body 2. Therefore, the hinge ground member 504 has a function of grounding the electric board 70 and the drive board 71.

As described above, in the embodiment, the hinge fixing member 60 for stably fixing the hinge unit 50 to the housing frame 300, and preventing breakage or damage of the housing frame 300 also has a grounding function.

In the foregoing, the automatic document conveying device 3A and the image forming apparatus 1 provided with the document pressing unit according to the embodiment are described. In the automatic document conveying device 3A as described above, it is possible to prevent concentration of stress on the housing frame 300, and it is possible to prevent breakage or damage of a portion of the housing frame 300 in the vicinity of the hinge unit 50. Therefore, it is possible to stably press a document sheet G on the contact glass 222, and it is also possible to automatically convey a document sheet G in a stable manner. Further, in the image forming apparatus 1, it is possible to stably form an image on a sheet, based on a document image read by the CIS unit 224 after a document carrying the document image is conveyed by the automatic document conveying device 3A, or based on a document image read by the CIS unit 224 after a document carrying the document image is placed on the contact glass 222. The present disclosure, however, is not limited to the aforementioned embodiment, and may be modified as follows, for example.

(1) The embodiment is described by using the automatic document conveying device 3A as the document pressing unit according to the present disclosure. The present disclosure, however, is not limited to the above. The document pressing unit may be a document pressing cover for pressing a document sheet G on the contact glass 222 from above. In this case, the image forming portion 93 of the image forming apparatus stably forms an image on a sheet, based on a document image read by the CIS unit 224. The reading unit in the present disclosure is not limited to the CIS unit 224, and may be another reading mechanism.

(2) Further, in the embodiment, the hinge fixing member 60 has a shape such that the hinge fixing member 60 covers the frame convex portion 300H of the housing frame 300. The present disclosure, however, is not limited to the above.

As far as it is possible to fix the hinge fixing member 60 to the housing frame 300 in a state that the fixing-member left flange 60L and the fixing-member right flange 60R of the hinge fixing member 60 are isolated from each other, the hinge fixing member 60 may have another shape.

(3) Further, in the embodiment, the hinge fixing member 60 and the hinge cover 502 are made of a metal material, and the housing frame 300 is made of a resin material. The present disclosure, however, is not limited to the above. Use of the aforementioned materials enables to stably protect the housing frame 300, which is likely to be broken or damaged by concentration of excessive stress, by the metal-made hinge cover 502 and the metal-made hinge fixing member 60. Further, forming the housing frame 300 having a large surface area of a resin material is advantageous in reducing a cost of the housing frame 300, as compared with a configuration, in which a housing frame is made of a metal material.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:
1. An automatic document conveying device, comprising:
a document pressing unit openable with respect to an apparatus body including a placement portion on which a document is placed, and configured to press the document from above;
a document feeding tray on which a document is placed;
a document conveying portion for conveying the document placed on the document feeding tray in such a manner that the document passes a predetermined reading position on the placement portion; and
a document discharge tray for receiving the document after the document passes the reading position, wherein the document pressing unit includes:
a body frame capable of pressing the document;
a pair of hinge units respectively including hinge legs to be mounted on the apparatus body, the paired hinge units being mounted on a lower surface portion of the body frame with a certain distance in a left-right direction on a rear end of the body frame, and being configured to support the body frame to be openable with respect to the apparatus body;
a pair of metal fixing members mounted on an upper surface portion of the body frame, and configured to fix the paired hinge units to the body frame, respectively; and
a plurality of fastening screws for fastening the fixing member and the hinge unit to each other through the body frame in such a manner that the fixing member and the hinge unit sandwich the body frame in an up-down direction, and
a plurality of screw holes are formed in the body frame for allowing the fastening screws to pass through the body frame between the fixing member and the hinge unit, each of the screw holes having an inner diameter larger than an outer diameter of a screw portion of each of the fastening screws, the automatic document conveying device further comprising:
an electric board; and
a connecting member for electrically connecting the electric board and the fixing member, wherein the hinge unit has a ground member having a function of grounding the electric board by being electrically connected to the fixing member and by being electrically connected to the apparatus body via the plurality of fastening screws.

2. The automatic document conveying device according to claim 1, wherein each of the paired hinge units includes:

a hinge body for pivotally supporting the hinge leg; and a metal hinge cover including a pair of hinge flanges disposed with a certain distance in the left-right direction in such a manner as to sandwich the hinge body, the hinge cover being fixed to the hinge body, each of the paired fixing members includes a pair of fixing-member flanges disposed to overlap the paired hinge flanges in such a manner as to sandwich the body frame in the up-down direction, the plurality of fastening screws fasten the hinge flange and the fixing-member flange to each other, and the plurality of screw holes are opened in the body frame between the hinge flange and the fixing-member flange.

3. The automatic document conveying device according to claim 2, wherein the body frame includes a pair of convex portions projecting upward in such a manner that each of the paired convex portions forms an accommodating portion for accommodating the hinge unit, and the fixing member has a shape such that the fixing member covers the convex portion from above between the paired fixing-member flanges.

4. The automatic document conveying device according to claim 1, wherein the body frame is made of a resin material.

5. The automatic document conveying device according to claim 4, wherein a part of the body frame constitutes the document discharge tray.

6. An image forming apparatus comprising:

the automatic document conveying device according to claim 1;

the apparatus body including the placement portion;

a reader configured to read a document image of the document to be conveyed by the automatic document conveying device at the reading position; and an image former configured to form an image on a sheet, based on the document image read by the reading portion.

* * * * *